Oct. 11, 1966     F. H. VAN WINSEN     3,278,196
WHEEL SUSPENSION
Filed Oct. 12, 1964                    2 Sheets-Sheet 1

INVENTOR.
FRIEDRICH H. VAN WINSEN

BY  *Dicke + Craig*
ATTORNEYS.

INVENTOR.
FRIEDRICH H. VAN WINSEN

BY Dicker + Craig
ATTORNEYS.

United States Patent Office 3,278,196
Patented Oct. 11, 1966

3,278,196
WHEEL SUSPENSION
Friedrich H. van Winsen, Kirchheim (Teck), Germany, assignor to Daimler-Benz Aktiengesellschaft, Stuttgart, Germany
Filed Oct. 12, 1964, Ser. No. 403,127
Claims priority, application Germany, Oct. 12, 1963, D 42,691
15 Claims. (Cl. 280—96.2)

The present invention relates to a wheel suspension for the steerable front wheels of motor vehicles, especially with a rear engine, by means of two superposed guide members; that is, two guide arms arranged one above the other which pivot or swing about different non-parallel axes.

The spatial conditions at the front axle of a motor vehicle are normally very limited. The steering deflection of the wheels requires a certain lateral play of the wheels which cannot be reduced beyond an extent conditioned by the necessary maximum angular positioning of the wheels. Two cross guide arms disposed one above the other are usually favored for the wheel suspension and guidance of the front wheels. However, such superposed transverse guide arms require the largest portion of the space between the wheels so that this space cannot be utilized or can be utilized only inadequately for other purposes, whereas such a space utilization is necessary above all with motor vehicles having a rear engine. Luggage spaces cannot be accommodated as a rule in that case at the front axle. Consequently, longitudinal guide members are also used sometimes which swing or pivot about vehicle cross axes but which are less suited for the front wheels than the transverse guide arms. Particularly, two superposed longitudinal guide members entail constructional difficulties.

Wheel suspensions in which the wheel carriers are suspended by a transverse guide member and a longitudinal guide member, make possible spatially more favorable conditions than wheel suspensions with two superposed guide members; however, unfavorable and disadvantageous movements of the steering pin take place thereby. Furthermore, the tendency of the vehicle to lower one vehicle end is not excluded during sudden braking.

The aim of the present invention is a wheel suspension which combines the advantages of the wheel guidance by means of two superposed transverse guide members with the spatial advantages of a partial longitudinal guidance and which simultaneously makes possible a far-reaching brake equilization. Accordingly, the present invention essentially consists in that the lower guide member is constructed essentially as transverse guide member with an approximately horizontal or with only a relatively slightly inclined bearing axis while the upper guide member is constructed essentially as longitudinal guide element whereby the upper guide member is supported to the rear of the wheel with a bearing axis directed obliquely with respect to the vehicle longitudinal and transverse directions as well as to the horizonal in such a manner that the instantaneous center for the movements of the wheel carrier; that is, the point of intersection of the extended movement radii of the joints connecting the two guide members with the wheel carrier, as viewed in side elevational view of the vehicle, lies in a rearward point approximately at the height of the the wheel center, preferably however somewhat lower, and at most slightly higher than the wheel center. Furthermore, the extended bearing axis of the upper guide member is to intersect the vertical vehicle transverse plane containing the wheel center axis in a point which is about at the same distance from the wheel as the point of intersection of the bearing axis of the lower guide member with the aforementioned plane.

During braking of the vehicle, a resultant braking force occurs at the point of contact of the front wheel and the road surface which is directed upwardly obliquely toward the rear, whereby the inclination of the brake force with respect to the horizontal depends on distribution of the vehicle weight on the front and rear axle. Depending upon the wheel suspension, the brake force prouces a torque which seeks to swing or pivot the wheel carrier in relation to the vehicle superstructure in a longitudinal plane about the aforementiond instantaneous center. This instantaneous center lies therefore theoretically most favorably for the prevention of the brake nodding or nose-diving, if as viewed in side view of the vehicle, it lies on the obliquely, upwardly and rearwardly directed straight line determined by the resultant brake force; that is, when the brake equalization amounts to about 100%. This means that with a location relatively close at the wheel, the instantaneous center lies as low as possible or with a position at a relatively large distance from the wheel possibly also higher than the wheel center of the wheel in the normal position thereof. A position of the aforementioned instantaneous center close to the wheel, however, would lead to large changes in caster of the wheel during spring deflections thereof and is therefore not useful for the wheel guidance of a steerable wheel. On the other hand, a location of the instantaneous center higher than the wheel center brings about that during inward or upward spring deflection of the wheel, the wheel center point moves forwardly by reason of its movement about the instantaneous center. Such a movement leads, however, to shocks in the wheel guidance which are transmitted to the vehicle superstructure and are amplified with greater displacement movement of the wheel center in the forward direction. The shocks are less if the wheel center moves during inward spring deflections of the wheel relative to the vehicle superstructure obliquely upwardly and slightly toward the rear; that is, the instantaneous center is lower than the wheel center. The conditions of a non-excessive change in caster, on the one hand, and of an inclined spring system preventing a shock transmission from the wheel to the vehicle superstructure thus represent contradictory requirements as regards the location of the instantaneous center which under a consideration of the further requirements of an arrangement excluding brake nose-diving, is most favorable when the instantaneous center of the wheel carrier is disposed approximately at the height of the wheel center with a relatively larger spacing from the same, for example, if the instantaneous center is disposed by at least one wheel diameter from the wheel center. The following advantages result therefrom:

Since the instantaneous center for the longitudinal spring system of the wheel determined by the point of intersection of the movement radii of the two guide joints of the wheel carrier is located relatively far from the wheel center, the change in caster of the wheel and therewith a disadvantageous influence of the steering is slight. A displacement of the wheel center toward the front during inward spring deflection of the wheel is avoided or nearly avoided by the low location of the instantaneous center behind the wheel or—with an instantaneous center disposed lower than the wheel center—an inclined spring system may be achieved favorable for the shock absorption at the wheel. The tendency on the part of the vehicle for brake-nose-diving or nodding is completely prevented or nearly completely prevented since the instantaneous center comes to lie in proximity of the obliquely rearwardly and upwardly directed brake force resultant acting at the point of contact of the wheel.

By reason of the use of an upper guide member which is constructed structurally as longitudinal guide member but operationally effective as inclined guide element, the space between the two front wheels—aside from the space necessary for the steering deflection of the wheels—can be made available for the utilization of other purposes, for example, for the accommodation of a large luggage space. A transverse arrangement of the lower guide member prevents to a lesser extent the space utilization since it can be located so low that it may be supported below the utilization space. Furthermore, with an inclined bearing support, the lower guide member may be located relatively close to the wheel and may, nevertheless receive an operationally effective greater length in the transverse direction in that the instantaneous center of its joint near the wheel can be displaced sufficiently far from the wheel in relation to the vertical transverse plane containing the wheel center axis. The same is true correspondingly also for the upper guide member whose joint near the wheel can receive, by reason of the inclined bearing support of the guide member, an instantaneous center within a vehicle cross plane that has any desired large distance from the wheel. Changes in camber of the wheel and cross movements of the point of contact of the wheel on the road surface which, particularly with steered wheels, are very disadvantageous, can be kept very small thereby.

Preferably the lower guide member is supported at the vehicle superstructure as inclined guide member in front of the vehicle transverse plane containing the wheel center axis whereby its bearing axis is directed obliquely toward the rear in the direction toward the opposite vehicle side as well as preferably horizontal or, for example, somewhat inclined downwardly toward the rear, whereas the upper guide member constructed from a structural point of view as longitudinal guide member—in contrast to the lower guide member—is directed rearwardly from the wheel. Particularly advantageous is such a high arrangement of the upper guide member that it as well as its joint connecting the same with the wheel carrier are located higher than the upper circumference of the wheel. Owing to such an arrangement, the wheel can, during the execution of its steering movement, swing through below the guide member, or the guide member can be located within the wheel plane or near the wheel plane without impairing the steering movements of the wheel. The guide member is thereby appropriately supported behind the wheel approximately in the vertical center plane of the wheel as it stands during straight drives, in that the guide member, for example, is cranked toward the outside for the support at the vehicle superstructure. Such a high arrangement of the upper guide member additionally has the advantage that by reason of the large distance between the lower and the upper joint of the wheel carrier, the angular changes of the wheel carrier or of the wheel steering pin and therewith changes in caster of the wheel can be further reduced. Furthermore, the moments occurring at the wheel can be absorbed in an advantageous manner with a large lever arm.

The upper guide member is appropriately directed obliquely upwardly from its bearing axis so that an undesirably high arrangement of the guide bearing at the vehicle superstructure can be avoided.

According to a further feature of the present invention, the wheel spring system is arranged directly adjacent to the wheel or adjacent to the wheel carrier pivotally connecting the two guide members, and is constructed as small telescopic spring, preferably supported on the lower guide member and operable with compression air. The wheel spring system can thereby be accommodated completely within the space which is already necessitated anyhow for the steering deflection of the wheel.

If an additional wheel spring means is to be provided, connecting the wheel suspension on both sides of the vehicle, such additional spring means may extend approximately at the height of the lower guide member below a forward utilization space. The stabilizer constructed, for example, as torsion rod is thereby supported at the vehicle superstructure preferably in the extended bearing axis of the respective lower guide member and is connected at its free ends with the lower guide members so that it swings together as a part thereof and possibly may serve for the support thereof.

Accordingly, it is an object of the present invention to provide a wheel suspension for motor vehicles which avoids in an extraordinarily effective manner and by simple means the shortcomings and drawbacks encountered with the prior art constructions.

Another object of the present invention resides in the provision of a steerable wheel suspension, especially for motor vehicles which permits the accommodation of a large utilization space between the steerable wheels of the vehicle.

A further object of the present invention resides in the provision of a rear engine motor vehicle having a front wheel suspension of such construction as to permit the accommodation of a large luggage space between the steerable front wheels.

Still a further object of the present invention resides in the provision of a wheel suspension for steerable front wheels which effectively permits the realization of the advantages obtainable from an operating point of view, with an arrangement using two superposed transverse guide arms in combination with the advantages realizable, from a space point of view, with a longitudinal wheel suspension guide system.

Another object of the present invention resides in the provision of a wheel suspension of the type described above which not only permits the attainment of the advantages mentioned above but also prevents undesirable movements of the steering pin and changes in the chamber and caster angles, and which precludes any unfavorable influence on the steering system.

Still another object of the present invention resides in the provision of a wheel suspension for the steerable front wheels of motor vehicles which increases the driving comfort by improving the handling of the steering system yet prevents the transmissions of shocks from the wheels to the vehicle superstructure.

A further object of the present invention resides in the provision of a wheel suspension in which the upper guide member is constructed as longitudinal guide member operable as transverse guide member so as to permit the accommodation of a large luggage space between the two steerable front wheels.

Still a further object of the present invention resides in the provision of a wheel suspension for steerable front wheels in which the spring system may be accommodated within a relatively small space necessary anyhow for the steering deflections of the wheels so as to further increase the useful space between the vehicle wheels.

These and further objects, features and advantages of the present invention will become more obvious from the following description when taken in connection with the accompanying drawing which shows, for purposes of illustration only, one embodiment in accordance with the present invention, and wherein.

Figure 1:
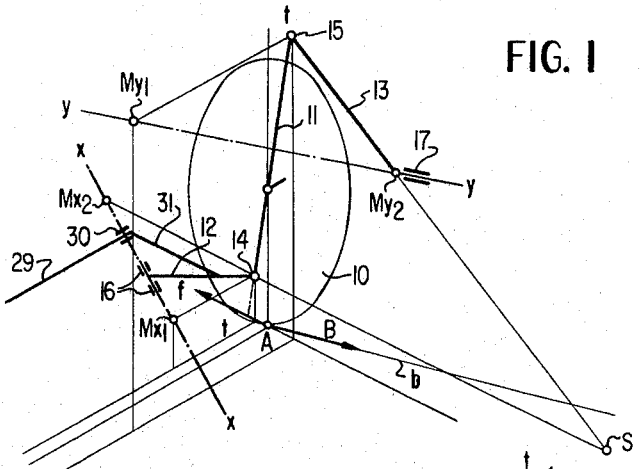
FIGURE 1 is a perspective schematic view of a wheel suspension in accordance with the present invention.

Referring now to the drawing wherein like reference numerals are used throughout the various views to designate like parts, and more particularly to FIGURE 1, reference numeral 10 designates in this schematic view a front wheel whose wheel carrier 11 is suspended at the vehicle superstructure, for example, at the frame or body of a vehicle by means of a lower guide member 12 and an upper guide member 13. The driving direction is indicated by the arrow $f$. The lower guide member 12 is connected to the wheel carrier 11 by a joint 14 and the upper guide member 13 by a joint 15 in such a manner that the wheel is steerable about an axis $t$—$t$ which intersects the road surface in front of the point of contact A of the wheel and road surface and therewith determines, in a known manner, the caster of the wheel.

Figure 2:
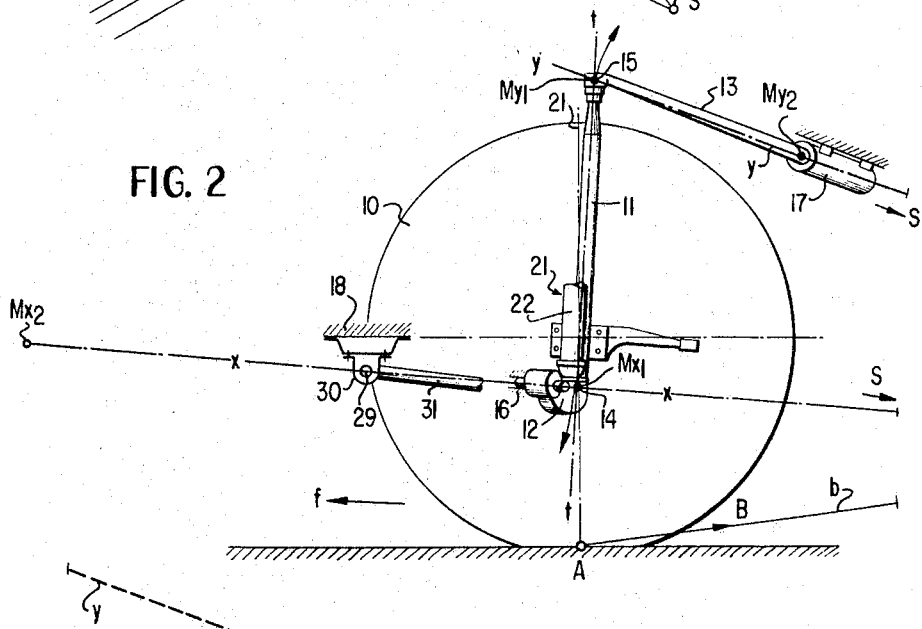
FIGURE 2 is a somewhat schematic side elevational view of the wheel suspension in accordance with the present invention.
Figure 3:
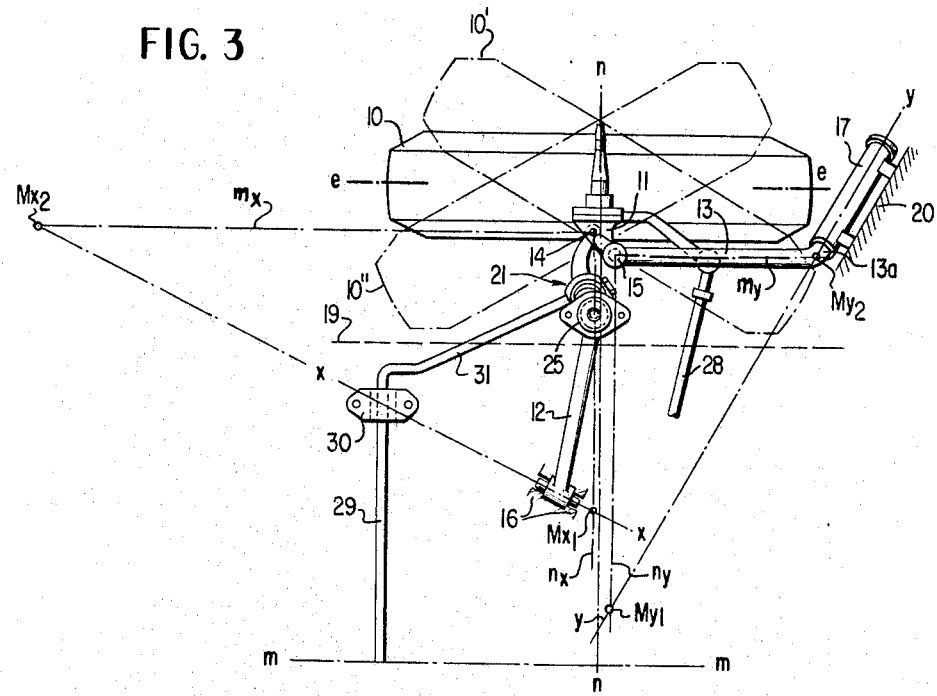
FIGURE 3 is a somewhat schematic plan view on the wheel suspension of FIGURE 2.

As may be seen particularly from FIGURE 3, the lower guide member 12 is constructed essentially as cross guide member while the upper guide member 13 is constructed essentially as longitudinal guide member. The lower guide member 12 swings or pivots thereby within a bearing 16 about an axis $x$—$x$ which is directed, on the one hand, obliquely toward the rear in the direction toward the vertical vehicle longitudinal center plane $m$—$m$ and, on the other, horizontally or nearly horizontally, for example, slightly downwardly toward the rear, whereby it intersects the vertical vehicle transverse plane $n_x$, which contains the outer guide joint 14 and is disposed in front of the transverse center plane $n$—$n$ of the wheel, in the point $Mx_1$ (FIG. 3) and further intersects a vertical longitudinal plane $m_x$ passing through the joint 14 in a point $Mx_2$. The bearing axis $y$—$y$ of the upper guide member 13, supported in the bearing 17, is directed, on the one hand, obliquely toward the front in the direction toward the vertical longitudinal center plane $m$—$m$ of the vehicle (FIG. 3) and, on the other, is directed obliquely upwardly toward the front (FIG. 2). The bearing axis $y$—$y$ intersects a vertical transverse plane $n_y$ passing through the guide joint 15 near the wheel and disposed to the rear of the transverse center plane $n$—$n$ of the wheel in a point $My_1$ and intersects a vertical longitudinal plane $m_y$ passing through the joint 15 in a point $My_2$. The points $Mx_1$ and $My_1$ are thereby the instantaneous centers for the movement of the joints 14 and 15 in a vertical transverse plane of the vehicle while the points $Mx_2$ and $My_2$ are the instantaneous center of the movements of the joints 14 and 15 in a vertical longitudinal plane. As may be seen from the drawing, the instantaneous centers $Mx_1$ and $My_1$ have relatively large spacing from the wheel, and do so notwithstanding the arrangement of the bearing 17 in the center plane $e$—$e$ of the wheel so that by reason of the correspondingly large and approximately equally large length of the swinging or pivot radii, also the lateral movements of the joints and therewith changes in camber of the wheels are relatively slight; this is the more so as the movement radii of the joints 14 and 15 in the cross planes $n_x$ and $n_y$ corresponding to the straight connecting lines $Mx_1$–14 and $My_1$–15 are disposed horizontally or nearly horizontally in the rest position of the wheel.

The movements of the wheel carrier 11 is determined in the vertical longitudinal plane, that is as viewed in side elevational view of the vehicle, by the location of the point of intersection S of the straight lines $Mx_2$–14 and $My_2$–15 which is the instantaneous center of the wheel carrier 11 in the center rest position of the wheel. In the illustrated rest position of the wheel, the straight line $Mx_2$–14 coincides with the bearing axis $x$—$x$ and the straight line $My_2$–15 with the bearing axis $y$—$y$, as viewed in side elevational view (FIG. 2), which, however, is not absolutely necessary even though desirable. As may be seen, the point S lies at a relatively large distance from the wheel slightly below the wheel center so that during upward or inward spring deflection of the wheel the wheel carrier 11 carries out a steep upward and rearwardly directed movement approximately in the direction of the steering axis $t$—$t$. Consequently, the movement takes place approximately in the direction of the main shocks coming from the road and with as little as possible a change in the caster of the wheel.

Figure 2A:
FIGURE 2a is the right extension of FIGURE 2.

If the vehicle is braked, a resultant brake force B occurs at the point of contact A of the wheel which is composed of a vertical component determined by the weight load of the front wheel and of a horizontal component acting opposite the driving direction and which has approximately the direction indicated in FIGURES 1 and 2. With the illustrated wheel guidance, the point S, as shown in FIGURE 2a, lies slightly below the straight line $b$ which is determined by the direction of the brake force B. This has as consequence that the brake force B exerts with a lever arm that corresponds to the distance of the point S from the straight line $b$ (as seen in side elevational view in FIGURE 2a), a moment rotating in the clockwise direction on the wheel which thus seeks to approach the vehicle superstructure. However, since during inward spring deflection of the wheel, the instantaneous center S of the wheel carrier 11 with simultaneous approachment toward the wheel, rises approximately along a curve $s$, already after a relatively small spring stroke the straight line $b$ is crossed over by the point of intersection S at point $S_b$, that is, a brake equalization of 100% and more is achieved. The brake force B will then act in the opposite direction in that—as is desirable—it seeks to distance the vehicle superstructure from the wheel.

The space utilizable as useful space between the two front wheels is practically unimpaired by the wheel guidance of the present invention. Whereas the lower guide member 12 is supported, at the spring-supported vehicle superconstruction, in a bearing 16 below the vehicle floor 18; the upper guide member 13 is located with its joint 15 connecting the same with the wheel carrier 11, as viewed in side elevational view, above the upper circumference of the front wheel as well as directly adjacent the front wheel when in the straight driving position. Consequently, the wheel can be deflected about its steering axis $t$—$t$ into the outermost deflected steering positions 10′ and 10″ without being impaired thereby by the upper guide member 13 which is disposed relatively high.

Since, on the other hand, the guide member 13 is disposed within the space which is delimited in the direction toward the vehicle center by the side wall 19 (FIG. 3) of a luggage space accommodated in the front part of the vehicle and which is required anyhow by the wheel when in its fully deflected position, an additional space is practically not required by the upper guide member 13 of the wheel suspension of the present invention. The upper guide member 13 is essentially constructed in a rod-shaped manner and is cranked toward the outside directly into a bearing pin at its bearing end 13a which is rotatably supported in the bearing sleeve or bushing of the bearing 17 disposed in the vertical center plane $e$—$e$ of the wheel when in its straight driving position. The bearing 17 is secured, for example, at a wall 20 (FIG. 3) adjoining the forward door column.

Figure 4:
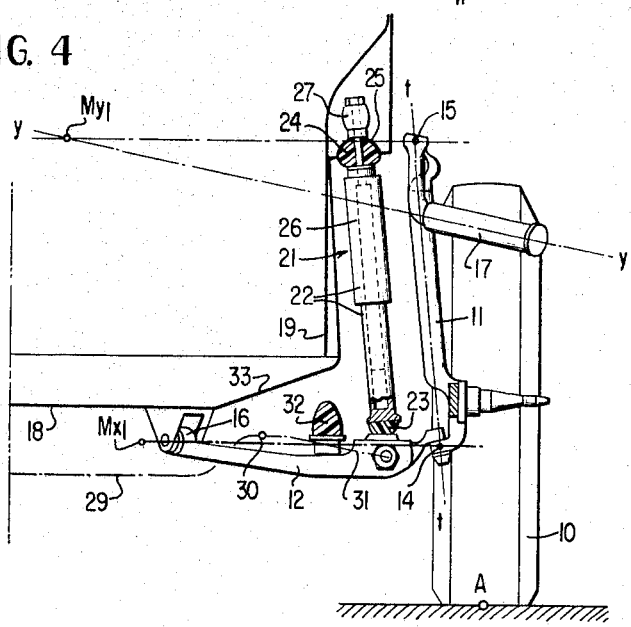
FIGURE 4 is a somewhat schematic rear elevational view of the wheel suspension in accordance with the present invention.

The wheel spring system generally designated by reference numeral 21 is furthermore accommodated within the space between the wheel 10 and the sidewall 19 of the luggage space or of a useful space utilizable for other purposes. The spring system 21 consists of a telescopic cylinder 22 (FIG. 4) which is pivotally supported, by the interposition of rubber 23, at the lower guide member 12 and which is supported at its upper end, also by the interposition of rubber 24, at a bracket 25 secured at the side wall 19. The telescopic cylinder 22 encloses a cylinder space 26 whose air content acts during spring deflection of the wheel as pneumatic spring and which may be in communication at the upper end of the linkage by way of a line 27 with an air supply tank or a compressor. The spring 21 arranged directly adjacent the wheel carrier 11 and parallel thereto lies, as indicated also in FIGURE 3, within the triangular space that is limited by the wheel position 10′ and 10″.

The steering of the wheels takes place by way of the steering linkage 28 (FIG. 3) which is actuated in the usual manner from a steering spindle by way of a steering gear (not shown).

A stabilizer 29, 31 in the form of a torsion rod is provided as additional spring which is supported at the vehicle floor 18 in bearings 30 (FIGS. 3 and 4) and below the vehicle floor 18 and whose bent ends 31 are operatively connected each with the respective lower guide member 12 of the two mutually opposite wheels. The bearing 30 is thereby arranged within the bearing axis $x-x$ of the associated lower guide member 12 so that during swinging or pivot movements of the guide member 12, the end 31 of the stabilizer carries out the same swinging movements. The stabilizer end 31 can, therefore, serve simultaneously for the reinforcement of the guide member so that the guide member 12 and stabilizer end 31 form a common triangularly shaped guide member.

For purposes of limiting the wheel stroke during inward spring deflections thereof, a rubber cushion or buffer 32 (FIG. 4) is provided which abuts against an abutment surface 33 disposed at the vehicle floor 18.

While I have shown and described one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:
1. A wheel suspension for the steerable front wheels of motor vehicles having a vehicle superstructure, especially rear engine vehicles, comprising for each wheel:
   two guide means disposed one above the other,
   wheel carrier means,
   joint means pivotally connecting said wheel carrier means with said guide means,
   spring means for suspension of the wheel relative to the superstructure from a lower to an upper limit of suspension
   and bearing support means rotatably supporting said guide means at the vehicle superstructure about nonparallel bearing axes,
   the lower guide means being constructed essentially as transverse guide structure having an approximately horizontal bearing axis,
   the upper guide means being constructed essentially as longitudinal guide structure having a bearing axis located behind the wheel and extending with respect to the vehicle longitudinal and transverse directions as well as with respect to the horizontal in such a manner that the instantaneous center at the mean position of suspension of the wheel for the movements of the wheel carrier means lies at a rearwardly disposed point at a height within the range of the height of the wheel center,
   the bearing axis of the upper guide means intersecting the vertical vehicle transverse plane of the upper joint means at a first point located above a second point formed by the intersection of the bearing axis of the lower guide means with the transverse plane of the lower joint means, said first point being located in the space between the second point and the central vertical longitudinal plane of the vehicle.

2. A wheel suspension according to claim 1, wherein the bearing axis of the lower guide means extends rearwardly in the direction toward the opposite vehicle side and at most, only slightly inclined with respect to the horizontal.

3. A wheel suspension according to claim 1 wherein the upper guide means and the joint means connecting the same with the wheel carrier means are disposed over the wheel circumference so that the wheel can carry out its steering deflections unimpeded by the upper guide means and within the area below said upper guide means.

4. A wheel suspension according to claim 1, wherein said bearing support means supports the upper guide means at the vehicle superstructure to the rear of the wheel approximately in the vertical longitudinal wheel center plane, with the wheel in the straight driving position thereof, and including cranked bearing means at the bearing end thereof.

5. A wheel suspension according to claim 1, wherein said upper guide means extends from the bearing support means, with the wheel in the normal rest position, toward the joint means connecting the same with the wheel carrier means, obliquely upwardly, and wherein said first point lies approximately at the height of said last-mentioned joint means.

6. A wheel suspension according to claim 1, wherein said wheel spring means is arranged directly adjacent the wheel including telescopic springs means.

7. A wheel suspension according to claim 6, wherein said spring means is supported on the lower guide means.

8. A wheel suspension according to claim 6, further comprising stabilizer means operatively connecting two oppositely disposed wheels and constructed as torsion rod, means pivotally supporting said stabilizer means at the vehicle superstructure in the extended bearing axis of a respective lower guide means, and means operatively connecting the free ends of said stabilizer means with said lower guide means so that said stabilizer means pivots with the ends thereof in unison with and as part of the lower guide means and serves for the support thereof.

9. A wheel suspension for the steerable front wheels of motor vehicles having a vehicle superstructure, especially rear engine vehicles, comprising for each wheel:
   two guide means disposed one above the other,
   wheel carrier means,
   joint means pivotally connecting said wheel carrier means with said guide means,
   spring means for suspension of the wheel relative to the superstructure from a lower to an upper limit of suspension,
   and bearing support means rotatably supporting said guide means at the vehicle superstructure about nonparallel bearing axes,
   the lower guide means being constructed essentially as transverse guide structure having an approximately horizontal bearing axis,
   the upper guide means being constructed essentially as longitudinal guide structure having a bearing axis located behind the wheel and extending with respect to the vehicle longitudinal and transverse directions as well as with respect to the horizontal in such a manner that the instantaneous center at the mean position of suspension of the wheel for the movements of the wheel carrier means lies at a rearwardly disposed point at a height within the range of the height of the wheel center,
   said guide means being so arranged and located that the longitudinal instantaneous center for the movements of the joint means, located near the corresponding wheel, of the lower guide means lies, as seen in side view of the vehicle, in front of the wheel and, with the wheel in the center rest position thereof, approximately at the height of said last-mentioned joint means, and that the longitudinal instantaneous center for the movements of the joint means, located near the corresponding wheel, of the upper guide means lies behind the wheel and with the wheel in the center rest position thereof, lower than the last-mentioned joint means.

10. A wheel suspension for the steerable front wheels of motor vehicles having a vehicle superstructure, especially rear engine vehicles, comprising for each wheel:
two guide means disposed one above the other,
wheel carrier means,
joint means pivotally connecting said wheel carrier means with said guide means,
spring means for suspension of the wheel relative to the superstructure from a lower to an upper limit of suspension,
and bearing support means rotatably supporting said guide means at the vehicle superstructure about non-parallel bearing axes,
the lower guide means being constructed essentially as transverse guide structure having an approximately horizontal bearing axis,
the upper guide means being constructed essentially as longitudinal guide structure having a bearing axis located behind the wheel and extending with respect to the vehicle longitudinal and transverse directions as well as with respect to the horizontal in such a manner that the instantaneous center at the mean position of suspension of the wheel for the movements of the wheel carrier means lies at a rearwardly disposed point at a height within the range of the height of the wheel center,
the bearing axes of the guide means, with the wheel in the center rest position thereof, approximately passing through the joint means located near the corresponding wheel of the respective guide means, as seen in side elevation of the vehicle,
said guide means being so arranged and located that the longitudinal instantaneous center for the movements of the joint means, located near the corresponding wheel, of the lower guide means lies, as seen in side view of the vehicle, in front of the wheel, and, with the wheel in the center rest position thereof, approximately at the height of said last-mentioned joint means, and that the longitudinal instantaneous center for the movements of the joint means, located near the corresponding wheel, of the upper guide means lies behind the wheel and with the wheel in the center rest position thereof, lower than the last-mentioned joint means.

11. A wheel suspension for the steerable front wheels of motor vehicles having a vehicle superstructure, especially rear engine vehicles, comprising for each wheel:
two guide means disposed one above the other,
wheel carrier means,
joint means pivotally connecting said wheel carrier means with said guide means,
spring means for suspension of the wheel relative to the superstructure from a lower to an upper limit of suspension,
and bearing support means rotatably supporting said guide means at the vehicle superstructure about non-parallel bearing axes,
the lower guide means being constructed essentially as transverse structure having an approximately horizontal bearing axis,
the upper guide means being constructed essentially as longitudinal guide structure having a bearing axis located behind the wheel and extending with respect to the vehicle longitudinal and transverse directions as well as with respect to the horizontal in such a manner that the instantaneous center at the mean position of suspension of the wheel for the movements of the wheel carrier means lies at a rearwardly disposed point at a height within the range of the height of the wheel center,
the bearing axis of the upper guide means intersecting the vertical vehicle transverse plane of the upper joint means at a first point located above a second point formed by the intersection of the bearing axis of the lower guide means with the transverse plane of the lower joint means, said first point being located in the space between the second point and the central vertical longitudinal plane of the vehicle,
the bearing axes of the guide means, with the wheel in the center rest position thereof, approximately passing through the joint means located near the corresponding wheel of the respective guide means, as seen in side elevation of the vehicle,
said guide means being so arranged and located that the longitudinal instantaneous center for the movements of the joint means, located near the corresponding wheel, of the lower guide means lies, as seen in side view of the vehicle, in front of the wheel and, with the wheel in the center rest position thereof, approximately at the height of said last-mentioned joint means, and that the longitudinal instantaneous center for the movements of the joint means, located near the corresponding wheel, of the upper guide means lies behind the wheel and with the wheel in the center rest position thereof, lower than the last-mentioned joint means.

12. A wheel suspension according to claim 11, wherein the bearing axis of the lower guide means extends rearwardly in the direction toward the opposite vehicle side and at most, only slightly inclined with respect to the horizontal.

13. A wheel suspension according to claim 12, wherein the upper guide means and the joint means connecting the same with the wheel carrier means are disposed over the wheel circumference so that the wheel can carry out its steering deflections unimpeded by the upper guide means and within the area below said upper guide means.

14. A wheel suspension for the steerable front wheels of motor vehicles having a vehicle superstructure, especially rear engine vehicles, comprising for each wheel:
two guide means disposed one above the other,
wheel carrier means,
joint means pivotally connecting said wheel carrier means with said guide means,
spring means for suspension of the wheel relative to the superstructure from a lower to an upper limit of suspension,
and bearing support means rotatably supporting said guide means at the vehicle superstructure about non-parallel bearing axes,
the lower guide means being constructed essentially as transverse guide structure having an approximately horizontal bearing axis,
the upper guide means being constructed essentially as longitudinal guide structure having a bearing axis located behind the wheel and extending with respect to the vehicle longitudinal and transverse directions as well as with respect to the horizontal in such a manner that the instantaneous center at the mean position of suspension of the wheel for the movements of the wheel carrier means lies at a rearwardly disposed point at a height within the range of the height of the wheel center,
the bearing axis of the upper guide means intersecting the vertical vehicle transverse plane of the upper joint means at a first point located above a second point formed by the intersection of the bearing axis of the lower guide means with the transverse plane of the lower joint means, said first point being located in the space between the second point and the central vertical longitudinal plane of the vehicle,
the bearing axes of the guide means, with the wheel in the center rest position thereof, approximately passing through the joint means loctaed near the corresponding wheel of the respective guide means, as seen in side elevation of the vehicle,
said guide means being so arranged and located that the longitudinal instantaneous center for the movements of the joint means, located near the corresponding wheel, of the lower guide means lies, as seen in side view of the vehicle, in front of the wheel and, with the wheel in the center rest position thereof, approximately at the height of said last-mentioned joint means, and that the longitudinal instantaneous center for the movements of the joint means, located near the corresponding wheel, of the upper guide means lies behind the wheel and with the wheel in the center rest position thereof, lower than the last-mentioned joint means, the bearing axis of the lower guide means extending rearwardly in the direction toward the opposite vehicle side and at most only slightly inclined with respect to the horizontal, the upper guide means and the joint means connecting the same with the wheel carrier means being disposed above the wheel circumference so that the wheel can carry out its steering deflections unimpeded by the upper guide means and within a region disposed below the upper guide means, said upper guide means extending from the bearing support means, with the wheel in the normal rest position, toward the joint means connecting the same with the wheel carrier means, obliquely upwardly, and wherein said first point lies approximately at the height of said last-mentioned joint means.

15. A wheel suspension for the steerable front wheel of motor vehicles having a vehicle superstructure, especially rear engine vehicles, comprising for each wheel:

two guide means disposed one above the other, wheel carrier means, joint means pivotally connecting said wheel carrier means with said guide means, and bearing support means rotatably supporting said guide means at the vehicle superstructure about nonparallel bearing axes, the lower guide means being constructed essentially as transverse guide structure having an approximately horizontal bearing axis, the upper guide means being constructed as longitudinal guide structure having a bearing axis located to the rear of the wheel and extending with respect to the vehicle longitudinal and transverse directions as well as with respect to the horizontal in such a manner that the instantaneous center at the mean position of suspension of the wheel for the movements of the wheel carrier means lies at a rearwardly disposed point at a height of the order of the height of the wheel, the bearing axis of the upper guide means intersecting the vertical vehicle transverse plane of the upper joint means at a first point located above a second point formed by the intersection of the bearing axis of the lower guide means with the transverse plane of the lower joint means, said first point being located in the space between the second point and the central vertical longitudinal plane of the vehicle, the bearing axes of the guide means, with the wheel in the center rest position thereof, approximately passing through the joint means, located near the corresponding wheel, of the respective guide means, as seen in side elevation of the vehicle, said guide means being so arranged and located that the longitudinal instantaneous center for the movements of the joint means, located near the corresponding wheel, of the lower guide means lies, as seen in side view of the vehicle, in front of the wheel, and, with the wheel in the center rest position thereof approximately at the height of said last-mentioned joint means, and that the longitudinal instantaneous center for the movements of the joint means, located near the corresponding wheel, of the upper guide means lies behind the wheel and, with the wheel in the center rest position thereof, lower than the last-mentioned joint means, the bearing axis of the lower guide means extending rearwardly in the direction toward the opposite vehicle side and at most only slightly inclined with respect to the horizontal, the upper guide means and the joint means connecting the same with the wheel carrier means being disposed above the wheel circumference so that the wheel can carry out its steering deflections unimpeded by the upper guide means and within the area disposed below the upper guide means, the bearing support means supporting the upper guide means at the vehicle superstructure to the rear of the wheel approximately in the vertical wheel center plane of the wheel, with the wheel in the straight driving position thereof, said upper guide means extending from the bearing support means, with the wheel in the normal rest position, toward the joint means connecting the same with the wheel carrier means, obliquely upwardly, and wherein said first point lies approximately at the height of said last-mentioned joint means, wheel spring means arranged directly adjacent the wheel including telescopic spring means supported on the lower guide means, and stabilizer means operatively connecting two oppositely disposed wheels and constructed as torsion rod, means pivotally supporting said stabilizer means at the vehicle superstructure in the extended bearing axis of a respective lower guide means, and means operatively connecting the free ends of said stabilizer means with said lower guide means so that said stabilizer means pivots with the ends thereof in unison with and as a part of the lower guide means and serves for the support thereof.

References Cited by the Examiner

UNITED STATES PATENTS

| | | | |
|---|---|---|---|
| 2,330,633 | 9/1943 | Seyerle | 180—73 |
| 2,775,467 | 12/1956 | Kraus et al. | 280—124 |
| 2,888,270 | 5/1959 | Wolfram. | |
| 2,899,236 | 8/1959 | Hodkin | 280—96.2 X |
| 2,968,492 | 1/1961 | Nallinger | 280—124 |
| 3,033,553 | 5/1962 | Allinquant | 267—15 |
| 3,105,699 | 10/1963 | Peras | 280—96.2 |
| 3,189,118 | 6/1965 | Arning | 267—20 X |

FOREIGN PATENTS

| | | |
|---|---|---|
| 1,070,040 | 11/1959 | Germany. |
| 1,264,109 | 5/1961 | France. |
| 917,268 | 1/1963 | Great Britain. |

KENNETH H. BETTS, *Primary Examiner.*